United States Patent [19]
Narita

[11] Patent Number: 4,551,749
[45] Date of Patent: Nov. 5, 1985

[54] CIRCUIT TO VARY THE PHASE OF THE COLOR BURST SIGNAL

[75] Inventor: Takato Narita, Atsugi, Japan

[73] Assignee: Sony Corporation, Tokyo, Japan

[21] Appl. No.: 516,259

[22] Filed: Jul. 22, 1983

[30] Foreign Application Priority Data

Jul. 30, 1982 [JP] Japan .................. 57-134127

[51] Int. Cl.⁴ .................. H04N 9/46; H04N 9/535
[52] U.S. Cl. .................. 358/28; 358/19
[58] Field of Search .................. 358/28, 19

[56] References Cited
U.S. PATENT DOCUMENTS

| | | | |
|---|---|---|---|
| 2,904,628 | 9/1959 | Haantjes et al. | 358/19 |
| 3,534,157 | 10/1970 | Skrydstrup | 358/28 |
| 4,479,141 | 10/1984 | Van Der Valk | 358/19 |

Primary Examiner—John W. Shepperd
Attorney, Agent, or Firm—Lewis H. Eslinger; Alvin Sinderbrand

[57] ABSTRACT

One color difference signal, for example, (B−Y) is modulated by a signal from a constant frequency wave generator which is phase-shifted by 90 degrees and other color difference signal (R−Y) is modulated by a signal generated from the constant frequency wave generator after the color difference signal (R−Y) is added with a predetermined DC level during a predetermined duration. This predetermined DC level is controlled by a variable resistor, and the predetermined duration is determined by a burst flag pulse. The modulated signals of the both color difference signals (R−Y), (B−Y) are mixed by a mixer.

4 Claims, 16 Drawing Figures

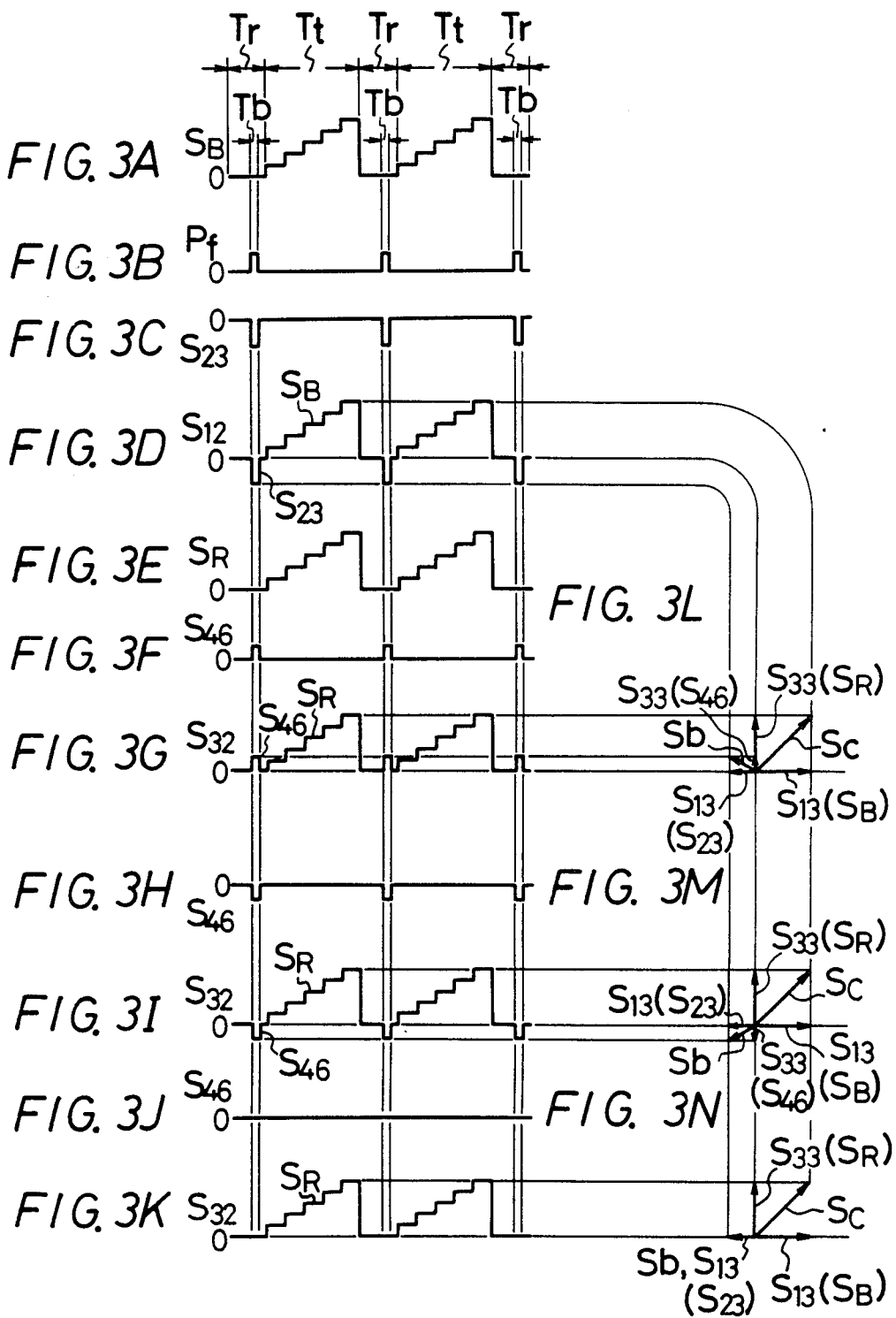

CIRCUIT TO VARY THE PHASE OF THE COLOR BURST SIGNAL

BACKGROUND OF THE INVENTION

1. Field of the Invention

The present invention relates generally to a hue control circuit and is directed more particularly to an improved hue control circuit for use with a hue corrector of a video signal processor.

2. Description of the Prior Art

A prior art hue control circuit is constructed as shown in FIG. 1. That is, a constant frequency signal (constant wave) CW generated by an oscillator 1A is phaseshifted by 90 degrees in a 90° phase shifter 2A and then balance-modulated in a balanced modulator 3A by a color difference signal, for example, (B−Y) color difference signal fed thereto through an input terminal 10A. The output signal CW from the oscillator 1A is also fed to a balanced modulator 4A and then balance-modulated by a color difference signal (R−Y) fed thereto through an input terminal 11A. The respective carrier chrominance signals thus provided are supplied to a mixer 7A and then mixed with each other.

The output signal from the oscillator 1A is further fed to a modulator 5A and therein modulated by a burst flag signal supplied thereto from an input terminal 12A. The modulated signal therefrom is supplied to a variable phase shifter 6A and thereby phase-shifted to have a predetermined phase. The phase shifting amount of this variable phase shifter 6A can be controlled by a control device 8A. The output from the variable phase shifter 6A is called as a color burst signal and serves as a reference signal for determining the hue. This color burst signal is supplied to the mixer 7A and mixed to the above-mentioned carrier chrominance signals to provide a normal carrier chrominance signal which is then delivered to an output terminal 9A.

According to the prior art hue control circuit described as above, a variable resistor Vr of the control device 8A is varied to shift the phase of the color burst signal and to thereby correct the hue. This prior art hue control circuit, however, can not be free from the following defects. That is, the color burst signal is provided separately so that there are required the modulator therefor and the phase shifter to vary the phase thereof. Further, due to the thermal characteristics, scattering and so on of the variable phase shifter 6A and the control device 8A, the phase of the burst signal which is once preset accurately is varied.

OBJECTS AND SUMMARY OF THE INVENTION

Accordingly, it is an object of the present invention to provide an improved hue control circuit.

It is another object of the present invention to provide a hue control circuit which does not require a modulator and a variable phase shifter which are necessary in the prior art for producing the burst signal.

According to an aspect of the present invention there is provided a hue control circuit used for a hue corrector of a video signal processor which comprises:

first adding means for adding a first DC voltage to a first color difference signal during a burst flag pulse being generated;

second adding means for adding a second DC voltage to a second color difference signal during said burst flag pulse being generated;

generating means for generating a first carrier signal and a second carrier signal, a phase difference between said first and second carrier signals being 90 degrees;

first modulating means for modulating said first carrier signal by an output signal of said first adding means;

second modulating means for modulating said second carrier signal by an output signal of said second adding means; and mixing means for mixing output signals of said first and second modulating means.

The additional and other objects, features and advantages of the present invention will become apparent from the following description taken in conjunction with the accompanying drawings.

BRIEF DESCRIPTION OF THE DRAWINGS

FIGS. 3A to 3N are respectively waveform diagrams used to explain the operation of the example shown in FIG. 2.

DESCRIPTION OF THE PREFERRED EMBODIMENT

The present invention will be described hereinafter with reference to the attaching drawings.

Figure 1:
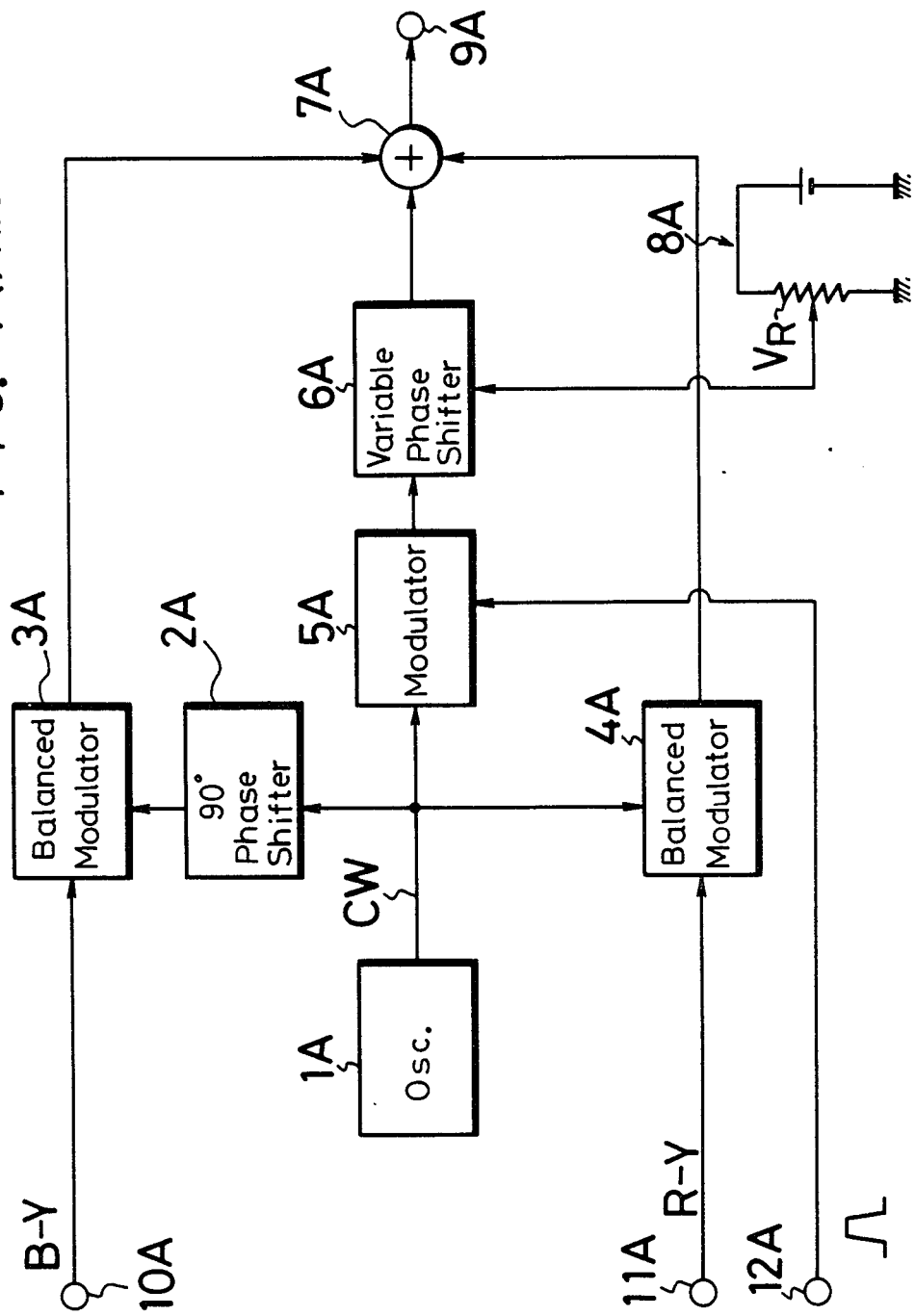
FIG. 1 is a block diagram showing a prior art hue control circuit.
Figure 2:
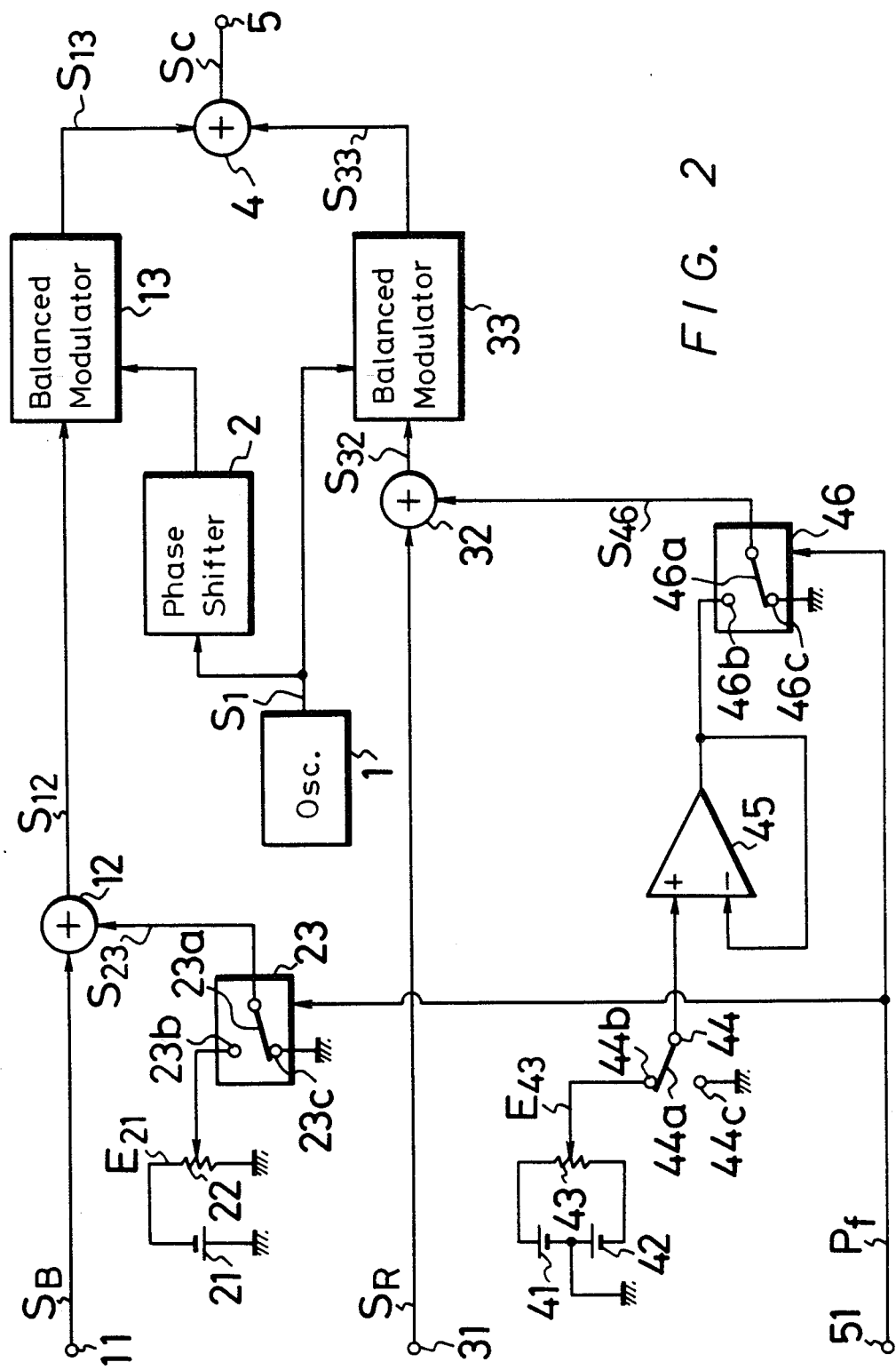
FIG. 2 is a block diagram showing an example of the improved hue control circuit according to the present invention.

FIG. 2 shows an example of the hue control circuit according to the present invention.

In the example of the invention depicted in FIG. 2, a color difference signal, for example, (B−Y) color difference signal $S_B$ shown in FIG. 3A is supplied through an input terminal 11 to an adding circuit or adder 12. In FIG. 3, reference letter $T_t$ designates a horizontal scanning period, $T_r$ a horizontal fly-back period and $T_b$ a burst period, respectively.

A DC voltage source 21 is provided. A DC voltage $E_{21}$ of the negative polarity derived from the DC voltage source 21 is applied through a variable resistor 22 for setting a burst level to a fixed contact 23b of a switch circuit 23 whose other fixed contact 23c is grounded to be a zero level.

A burst flag pulse Pf, which becomes "1" at every burst period $T_b$ as shown in FIG. 3B, is supplied through an input terminal 51 to the switch circuit 23 as a control signal such that when Pf="0", the switch circuit 23 is changed to the position shown in FIG. 2 i.e. its movable contact piece 23a is contacted with its fixed contact 23c while when Pf="1", the switch circuit 23 is changed to the position opposite to that shown in FIG. 2 or its movable contact piece 23a contacts with the fixed contact piece 23b. Thus, from the switch circuit 23 derived is a pulse signal $S_{23}$ which becomes a predetermined negative level during the burst period $T_b$ as shown in FIG. 3C.

The signal $S_{23}$ is then supplied to the adder 12 and added to the signal $S_B$ so that from the adder 12 derived is a (B−Y) color difference signal $S_{12}$ which includes the (B−Y) color difference signal $S_B$ in the scanning period $T_t$ and the signal $S_{23}$ in the burst period $T_b$ as shown in FIG. 3D. This signal $S_{12}$ is fed to a balanced modulator 13. A color subcarrier signal $S_1$ with the phase on a (R−Y) axis is derived from the oscillator 1 and then fed to the phase shifter 2 to have the phase on a (B−Y) axis. Thereafter, the signal is supplied to the balanced modulator 13. Thus, from this balanced modulator 13 produced is a carrier chrominance signal $S_{13}$ which is balance-modulated by the signal $S_{12}$. At this time, since as shown in FIG. 3L the signal $S_{13}$ is modulated by the signal $S_B$ in the signal $S_{12}$ in the scanning period $T_t$, it is coincident with the (B−Y) axis while since the signal $S_{13}$ is modulated by the signal $S_{23}$ in the signal $S_{12}$ in the burst period $T_b$, it is coincident with the −(B−Y) axis. This signal $S_{13}$ from the balanced modulator 13 is supplied to the adder or mixer 7.

In FIG. 2, reference numeral 31 denotes an input terminal through which a (R−Y) color difference signal $S_R$ such as shown in FIG. 3E is fed to an adder 32. DC voltage sources 41 and 42 are connected in series, the connection point therebetween is grounded, and a variable resistor 43 is connected in parallel to the series connected voltage sources 41 and 42. DC voltages with positive and negative polarities from the DC voltage sources 41 and 42 are applied to a variable resistor 43 for hue adjustment. A DC voltage $E_{43}$, whose polarity and level can be continuously varied in response to the adjusted position of the variable resistor 43, is derived from this variable resistor 43 and then applied to a fixed contact 44b of an ON/OFF switch 44 for hue adjustment. Another fixed contact 44c of the switch 44 is grounded to be of a zero level.

When the hue control or adjustment is carried out by the hue control circuit of this invention shown in FIG. 2, the switch 44 is changed to the position in FIG. 2 i.e. its movable contact piece 44a is contacted with its fixed contact 44b. Thus, the voltage $E_{43}$ is derived through the switch 44 and applied through a buffer amplifier 45 to a fixed contact 46b of a switch circuit 46 whose other fixed contact 46c is grounded to be of a zero level. The burst flag pulse Pf from the therminal 51 is fed to the switch circuit 46 as its control signal such that when Pf="0", the switch circuit 46 is changed to the position shown in FIG. 2 i.e. its movable contact piece 46a is contacted with its fixed contact 46c while when Pf="1", the switch circuit 46 is switched to the position opposite to that shown in the figure or its movable contact piece 46a contacts with its fixed contact 46b.

Thus, if the condition $E_{43}>0$ is satisfied, from the switch circuit 46 derived is a pulse signal $S_{46}$ which becomes a positive level equal to that of the voltage $E_{43}$ during the burst period $T_b$ as shown in FIG. 3F. The signal $S_{46}$ derived from the switch circuit 46 is applied to the adder 32 and then added to the signal $S_R$. Therefore, from the adder 32 obtained is a (R−Y) color difference signal $S_{32}$ which contains the (R−Y) color difference signal $S_R$ during the scanning period $T_t$ and the signal $S_{46}$ in the burst period $T_b$ as shown in FIG. 3G.

The signal $S_{32}$ from the adder 32 is applied to a balanced modulator 33 which is also supplied with the color subcarrier signal $S_1$ with the phase on the (R−Y) axis from the oscillator 1. Therefore, from the balanced modulator 33 produced is a carrier chrominance signal $S_{33}$ which is balance-modulated by the signal $S_{32}$. At this time, since as shown in FIG. 3L, the signal $S_{33}$ is modulated by the signal $S_R$ in the signal $S_{32}$ during the scanning period $T_t$, it coincides with the (R−Y) axis while since it is modulated by the signal $S_{46}$ in the signal $S_{32}$ during the burst period $T_b$, it coincides with the (R−Y) axis, too.

The signal $S_{33}$ from the balanced modulator 33 is supplied to the mixer or adder 4 to be added to the signal $S_{13}$ supplied thereto from the balanced modulator 13. Thus, the adder 7 produces a carrier chrominance signal (orthogonal two-phase balance modulation signal) $S_C$ including the burst signal $S_b$ as shown in FIG. 3L. In other words, during the scanning period $T_t$, the signal $S_{13}$ modulated by the signal $S_B$ and the signal $S_{33}$ modulated by the signal $S_R$ are vector-composed in the adder 7 to be the carrier chrominance signal $S_C$, while during the burst period $T_b$, the signal $S_{13}$ modulated by the signal $S_{23}$ and the signal $S_{33}$ modulated by the signal $S_{46}$ are vector-composed in the adder 7 to be the burst signal $S_b$.

In this case, if the level of the DC voltage $E_{43}$ is varied, the level of the signal $S_{33}$ which is modulated by the signal $S_{46}$ is varied. Thus, the phase of the burst signal $S_b$ is varied within the second quadrant in response to the above level variation.

The above description is given on the case of $E_{43}>0$. However, if the variable resistor 43 is set to satisfy the condition $E_{439}<0$, the signal $S_{46}$ becomes to have a negative level equal to that of the voltage $E_{43}$ during the burst period $T_b$ as shown in FIG. 3H. Thus, the signal $S_{32}$ becomes as shown in FIG. 3I. As a result, the signal $S_{33}$ becomes to have such a phase as shown in FIG. 3M so that the signal $S_C$ and the burst signal $S_b$ contained therein become as shown in the same figure.

In this case, if the voltage $E_{43}$ is varied in level, the level of the signal $S_{33}$ which is modulated by the signal $S_{46}$ is also varied. Therefore, the phase of the burst signal $S_b$ is varied within the third quadrant in response to the above variation.

Further, if the voltage $E_{43}$ is set as zero ($E_{43}=0$) or the movable contact piece 44a of the switch 44 is connected to its fixed contact 44c, the signal $S_{46}$ becomes zero ($S_{46}=0$) as shown in FIG. 3J and hence the signal $S_{32}$ becomes as shown in FIG. 3K. Thus, the signal $S_C$ and the burst signal $S_b$ contained therein become as shown in FIG. 3N wherein the phase of the burst signal $S_b$ coincides with the −(B−Y) axis.

Accordingly, if the variable resistor 43 is varied, the polarity and level of the voltage $E_{43}$ are varied and the phase of the burst signal $S_b$ in the carrier chrominance signal $S_C$ is varied. Thus, the hue can be corrected or controlled.

In the above example of the invention, the signal $S_{13}$ modulated by the signal $S_{23}$ is vector-composed on the signal $S_{33}$ modulated by the signal $S_{46}$ to vary the phase of the burst signal $S_b$. In this case, even though the phase of the burst signal $S_b$ is varied within the range of, for example, ±15°, the level variation of the burst signal $S_b$ is 1/cos 15°≅1.035 and hence this level variation can be neglected.

According to the present invention, as set forth above, at the same time when the color difference signals $S_B$ and $S_R$ are converted to the carrier chrominance signal $S_C$, the hue can be corrected or controlled.

Especially, with the present invention, since the pulse signals $S_{23}$ and $S_{46}$ are respectively added to the color difference signals $S_B$ and $S_R$ to produce the burst signal $S_b$, it is unnecessary to provide the modulator and the phase shifter to produce the burst signal $S_b$.

Further, according to the invention the correcting amount of the hue can be adjusted by varying the polarity and level of the voltage $E_{43}$. In this case, since the voltage $E_{43}$ is merely a DC voltage, the variable resistor 43 which sets the voltage $E_{43}$ can be easily provided on an operation panel. Thus, the operation for the variable resistor 43 becomes convenient. There is no fear that the voltage $E_{43}$ interferes with the other signals.

In addition, with the present invention, if the switch 44 is changed to the position opposite to that shown in FIG. 2, the correcting amount of the hue can be made zero accurately.

In the above example of the invention, it may be possible that between the switch circuits 23, 46 and the adders 12, 32 there are respectively provided waveform shaping circuits such as low pass filters to make the waveforms of the signals $S_{23}$ and $S_{46}$ each trapezoidal.

The above description is given on a single preferred embodiment of the invention, but it will be apparent that many modifications and variations could be effected by one skilled in the art without departing from the spirits or scope of the novel concepts of the invention, so that the scope of the invention should be determined by the appended claims only.

I claim as my invention:

1. A hue control circuit used for a hue corrector of a video signal processor comprising:

first adding means for adding a first DC voltage to a B−Y color difference signal during generation of a burst flag pulse;

means for selecting a second DC voltage;

second adding means for adding said second DC voltage to an R−Y color difference signal during generation of said burst flag pulse.

generating means for generating a first carrier signal and a second carrier signal with a phase difference of 90 degrees between said first and second carrier signals;

first modulating means for modulating said first carrier signal by an output signal of said first adding means;

second modulating means for modulating said second carrier signal by an output signal of said second adding means; and mixing means for mixing output signals of said first and second modulating means;

whereby a phase of a burst signal output from said mixing means is varied in accordance with said second DC voltage.

2. A hue control circuit according to claim 1, in which said first DC voltage is a negative DC voltage.

3. A hue control circuit according to claim 2, in which said means for selecting said second DC voltage is manually controllable to make said second DC voltage variable in level and polarity, and the hue is controlled thereby.

4. A hue control circuit according to claim 2, in which said generating means includes an oscillator and a phase shifter for shifting the phase of an output signal from said oscillator by 90 degrees.

* * * * *